United States Patent
Takahashi et al.

(10) Patent No.: US 7,221,844 B2
(45) Date of Patent: May 22, 2007

(54) OPTICAL WAVEGUIDE CIRCUIT COMPONENT AND METHOD OF MANUFACTURING THE SAME

(75) Inventors: Fumio Takahashi, Yokohama (JP);
Fumitaka Yoshino, Yokohama (JP);
Yusuke Terada, Yokohama (JP);
Yutaka Natsume, Yokohama (JP)

(73) Assignee: Omron Corporation, Kyoto-shi (JP)

( * ) Notice: Subject to any disclaimer, the term of this patent is extended or adjusted under 35 U.S.C. 154(b) by 0 days.

(21) Appl. No.: 11/235,580

(22) Filed: Sep. 26, 2005

(65) Prior Publication Data

US 2006/0018589 A1 Jan. 26, 2006

Related U.S. Application Data

(63) Continuation of application No. PCT/JP2004/004456, filed on Mar. 29, 2004.

(30) Foreign Application Priority Data

Mar. 28, 2003 (JP) .............................. 2003-090776

(51) Int. Cl.
*G02B 6/10* (2006.01)
*G02B 6/26* (2006.01)
(52) U.S. Cl. ........................... 385/131; 385/15; 385/39; 385/42
(58) Field of Classification Search ......... 385/129–132
See application file for complete search history.

(56) References Cited

U.S. PATENT DOCUMENTS 6,553,170 B2 * 4/2003 Zhong et al. ............... 385/130

FOREIGN PATENT DOCUMENTS

| JP | 58-223106 A | 12/1983 |
| JP | 2-64506 A | 3/1990 |
| JP | 6-88914 A | 3/1994 |
| JP | 7-261040 A | 10/1995 |
| JP | 8-15538 A | 1/1996 |
| JP | 2001-74972 A | 3/2001 |
| JP | 2003-43272 A | 2/2003 |

OTHER PUBLICATIONS

PCT translation of the Written Opinion of the International Searching Authority for International Appln No. PCT/JP2004/004456;4 sheets.
S. Suzuki et al, "Polarisation-Insensitive arrayed-waveguide grating multiplexer with $SiO_2$-on-$SiO_2$ structure", Electronics Letters, Apr. 14, 1994, vol. 30, No. 8, pp. 642-643.

* cited by examiner

*Primary Examiner*—Michelle Connelly-Cushwa
(74) *Attorney, Agent, or Firm*—Frishauf, Holtz, Goodman & Chick, P.C.

(57) ABSTRACT

An optical waveguide circuit component according to the present invention is characterized by that a clad layer composed of quartz is provided on the surfaces of a substrate and core formed by quartz doped selectively on a quartz plate structure, and a lid or a cover member is fixed onto the clad layer by heat pressing. With this structure, it is possible to reduce the magnitude of a polarization-dependent loss (PDL) generated when the lid and clad layer are combined.

15 Claims, 4 Drawing Sheets

OPTICAL WAVEGUIDE CIRCUIT COMPONENT AND METHOD OF MANUFACTURING THE SAME

CROSS-REFERENCE TO RELATED APPLICATIONS

This is a Continuation Application of PCT Application No. PCT/JP2004/004456, filed Mar. 29, 2004, which was published under PCT Article 21(2) in Japanese.

This application is based upon and claims the benefit of priority from prior Japanese Patent Application No. 2003-090776, filed Mar. 28, 2003, the entire contents of which are incorporated herein by reference.

BACKGROUND OF THE INVENTION

1. Field of the Invention

The present invention relates to an optical waveguide circuit component incorporating an optical waveguide circuit and a method of manufacturing the same, and, more particularly, to a planar light wave circuit component with a small polarization-dependent loss and a method of manufacturing the same.

2. Description of the Related Art

A planer light wave circuit (PLC) component is well known as an optical waveguide circuit component. As an example of a PLC component, an optical waveguide device is disclosed in Jpn. Pat. Appln. KOKAI Publication No. 2003-43272.

In this device, the pattern of an optical waveguide circuit is formed on a silicon wafer, and a cover layer called a lid (an auxiliary plate in Jpn. Pat. Appln. KOKAI Publication No. 2003-43272) is fixed onto the silicon wafer formed with an optical waveguide circuit.

An optical waveguide circuit is formed on a substrate processed by etching or the like. In general, a core is provided as a lower clad layer on a quartz glass plate, for example, and the core is covered by an upper clad layer.

A lid provided on a substrate protects the substrate, and provides a connection surface for an input/output connector that is optically connected to a PLC component, facilitating the connection.

Jpn. Pat. Appln. KOKAI Publication No. 2001-74972 discloses a structure to fix an optical waveguide circuit board to a holder by using an elastic adhesive.

As described in Jpn. Pat. Appln. KOKAI Publication Nos. 2003-43272 and 2001-74972, in the optical circuit board provided with an optical waveguide circuit, an auxiliary member such as a lid is fixed by using an adhesive. An adhesive is softened and applied to the bonding surface of a substrate or lid. When the adhesive is hardened, the lid is fixed to the substrate. An adhesive itself shrinks when hardened, and generates stress internally. This internal stress is transmitted not only to the lid, but also the optical circuit board, generating a similar internal stress in the optical circuit board. As a result, one of the longitudinal mode (TE mode) and transverse mode (TM mode) of an optical beam transmitted in the light waveguide circuit is greatly attenuated, and the ratio is changed. Namely, a polarization-dependent loss is increased.

Particularly, in an optical distributor, for example, an optical directional coupler having one input and two outputs, a polarization-dependent loss of an input beam generated during transmission in the distributor is increased.

If an atmospheric temperature of an optical waveguide circuit component is changed, internal stress is generated in a substrate according to the coefficient of thermal expansion, and a polarization-dependent loss is generated in an optical beam transmitted in the optical waveguide circuit as described above, because the coefficients of thermal expansion of the substrate and adhesive are different.

The above-mentioned problem is concerned with an optical distributor, but not limited to an optical distributor. Similar problems arise in other optical components having an optical waveguide circuit, for example, an optical branch circuit.

BRIEF SUMMARY OF THE INVENTION

It is an object of the present invention is to provide an optical waveguide circuit component with a suppressed polarization-dependent loss, and a method of manufacturing the same.

The present invention has been made to solve the above problem, and to provide an optical waveguide circuit component comprising:

a constructed substrate including a substrate;

an optical waveguide circuit provided in the constructed substrate; and a lid fixed to the constructed substrate, wherein the constructed substrate and the lid are combined in a boundary area formed by the composition of the lid and the composition of the constructed substrate directly contacting the lid.

In the optical waveguide circuit component, a lid is fixed to a constructed substrate without using an adhesive in the boundary area formed by the composition of the lid and the composition of the constructed substrate directly contacting the lid. Therefore, internal stress generated by use of adhesive is small in the boundary area combining the lid and constructed substrate, and the stress is not transmitted within the constructed substrate, and a polarization-dependent loss is suppressed in an optical beam transmitted in the optical waveguide circuit.

In the above optical waveguide circuit component, the boundary area is formed by heat fusing or heat pressing the lid and constructed substrate. By heat fusing or heat pressing without using an adhesive, the boundary area formed by the composition of the lid and the composition of the constructed substrate directly contacting the lid is formed on the contact surface of the lid and constructed substrate. Even if the lid and constructed substrate are partially contacted in the contact surface, the contact is spread by heat fusing or heat pressing, and they are combined more certainly.

In the above optical waveguide circuit component, the lid and constructed substrate have substantially the same coefficient of thermal expansion. Even during heating, or even if the atmospheric temperature of the optical waveguide circuit is changed, generation of internal stress is suppressed, because the lid and constructed substrate are expanded with the same coefficient of thermal expansion.

Also, the present invention is provided, an optical waveguide circuit component comprising:

a constructed substrate including a substrate;

an optical waveguide circuit provided in the constructed substrate; and a lid fixed to the constructed substrate and made of substantially the same material as the constructed substrate, wherein the constructed substrate and the lid are combined by directly contacting each other.

In the optical waveguide circuit component, by heat fusing or heat pressing without using an adhesive, the boundary area formed by the composition of the lid and the composition of the constructed substrate directly contacting the lid is formed on the contact surface of the lid and constructed substrate have substantially the same coefficient of thermal expansion. Therefore, internal stress generated by use of adhesive is small in the boundary area combining the lid and constructed substrate, and the stress is not transmitted within the constructed substrate, and a polarization-dependent loss is suppressed in an optical beam transmitted in the optical waveguide circuit.

In this optical waveguide circuit component, the lid and constructed substrate are made of substantially the same glass material. Therefore, the lid and constructed substrate are securely combined without changing the bonding surface composition, and internal stress is not generated.

In the optical waveguide circuit component, the constructed substrate includes a substrate and a clad layer provided on the substrate, and a core is buried as an optical waveguide circuit in the clad layer. Even in the optical waveguide component with such a structure, the lid and constructed substrate are securely combined on the boundary or bonding surface, and generation of internal stress is suppressed.

In the above optical waveguide circuit component, the constructed substrate includes a substrate, a first clad layer provided on the substrate, and a second clad layer provided on the first clad layer, and the core as an optical waveguide circuit is buried in one of the first and second clad layers. Even in a constructed substrate with a so-called under-clad layer provided as a first clad layer, the lid and constructed substrate are securely combined in the boundary or bonding surface, and generation of internal stress is suppressed.

In the above optical waveguide circuit component, the core is formed as an optical waveguide circuit in the substrate. Even in the optical waveguide circuit component with such a structure, the lid and constructed substrate are securely combined in the boundary or bonding surface, and generation of internal stress is suppressed.

Further, the present invention is provided, a method of manufacturing an optical waveguide circuit component comprising:

a step of preparing a substrate and a lid;

a step of forming a core on the substrate;

a step of covering the surfaces of the substrate and the core with a clad layer to form a constructed substrate; and a step of heat fusing or heat pressing a lid directly onto the clad layer.

According to a method of manufacturing the optical waveguide circuit component, the lid and constructed substrate are combined without using an adhesive in the boundary or contacting area formed by the composition of the lid and constructed substrate directly contacting the lid. Therefore, internal stress is small in the boundary area combining the lid and constructed substrate, and the stress is not transmitted within the constructed substrate, and a polarization-dependent loss is suppressed in an optical beam transmitted in the optical waveguide circuit.

In the above method of manufacturing the optical waveguide circuit component, the step of forming a core includes a step of depositing core material, and the step of covering with a clad layer includes a step of depositing clad material. In the optical waveguide circuit component, the internal stress generated combining the lid and constructed substrate is small.

In the above method of manufacturing the optical waveguide circuit component, the step of forming a core includes a step of making a predetermined area of the base plate as a core area by ion exchange. In the optical waveguide circuit component, the internal stress generated combining the lid and constructed substrate.

In the above method of manufacturing the optical waveguide circuit component, the step of preparing a substrate includes a step of providing a first clad on the substrate. Even in the constructed substrate provided with the first clad layer, generation of internal stress is small.

In the above method of manufacturing the optical waveguide circuit component, the lid and constructed substrate have substantially the same coefficient of thermal expansion. Even during heating or even if the atmospheric temperature of the optical waveguide circuit component is changed, generation of internal stress is suppressed, because the lid and constructed substrate are expanded with the same coefficient of thermal expansion.

In the above method of manufacturing the optical waveguide circuit component, the lid and constructed substrate are made of substantially the same material, or the lid and substrate are made of substantially the same material. Therefore, the lid and substrate have the same coefficient of thermal expansion, and generation of internal stress is suppressed.

In the above method of manufacturing the optical waveguide circuit component, the lid and constructed substrate are made of substantially the same glass material. Therefore, the lid and constructed substrate are securely combined without changing the composition of the combining surface, and internal stress is not generated.

DETAILED DESCRIPTION OF THE INVENTION

Hereinafter description will be given of the optical waveguide circuit component according to the embodiments of the present invention and the method of manufacturing the same.

Figure 1:
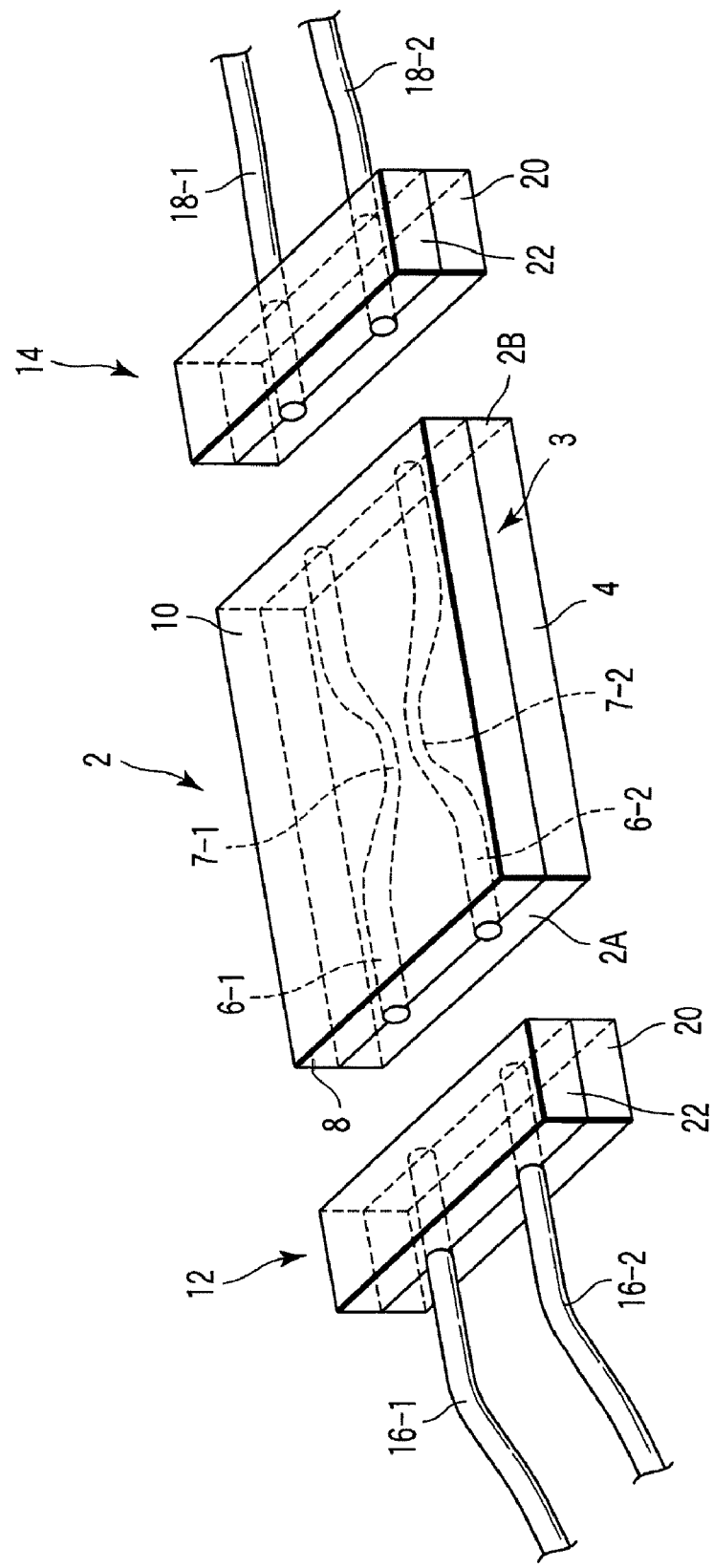
FIG. 1 is a schematic perspective view showing an example of an optical directional coupler as an optical waveguide circuit component according to an embodiment of the present invention.

FIG. 1 shows a typical optical distributor as an optical waveguide circuit component. The optical distributor 2 shown in FIG. 1 is an optical directional coupler having one input and two outputs, in which an optical signal input to one of two input ports is output as an optical beam from two output ports. The optical directional coupler 2 has a constructed substrate 3. In the constructed substrate 3, a pair of cores 6-1 and 6-2 as an optical waveguide circuit is buried in a clad layer 8 formed on a substrate 4.

In the constructed substrate 3 shown in FIG. 1, the substrate 4 itself functions as a clad layer 8. But, as explained later using FIG. 5, it is also possible to adopt a structure in which another clad layer 5 is provided on the substrate 4, one more clad layer 8 is provided on the clad layer 5, and a pair of cores 6-1 and 6-2 is buried in the clad layer 8.

Each of the cores 6-1 and 6-2 is extended in the clad layer 8 up to the output port 2B from the input port 2A of the optical directional coupler 2. The cores 6-1 and 6-2 are extended and positioned close to each other in the extension route, held in the closely positioned state in proximal portions 7-1 and 7-2, and separated again. Therefore, an optical beam input to one of the cores 6-1 and 6-2 in the input port 2A is transmitted with a specific ratio to the other core in the proximal portions 7-1 and 7-2, and output from the respective cores 6-1 and 6-2 in the output port 2B.

On the constructed substrate 3 with a pair of buried cores 6-1 and 6-2, a lid 10 is provided as a cover of the constructed substrate 3 by heat fusing or heat pressing without using an adhesive, as described later. An input side connector 12 is provided in the input port 2A of the optical directional coupler 2. The output ports of optical fibers 16-1 and 16-2 fixed to the input side connector 12 are optically connected to the cores 6-1 and 6-2. An output side connector 14 is provided in the output port 2B. The cores 6-1 and 6-2 are connected to the input ports of optical fibers 18-1 and 18-2 of the output side connector 14. An optical beam input to one of the optical fibers 16-1 and 16-2 is distributed to the optical fibers 18-1 and 18-2 through the optical directional coupler 2.

Each of the input side connector 12 and output side connector 14 is composed of a V-grooved substrate 20 with a V-shaped groove and a cover 22, and constructed to have the corresponding optical fibers 16-1 and 16-2 or 18-1 and 18-2 in the groove of the V-grooved substrate 20. Namely, the optical fibers 16-1/16-2 and 18-1/18-2 are held between the V-grooved substrate 20 and cover 22. The V-grooved substrate 20, cover 22 and optical fibers 16-1/16-2 and 18-1/18-2 are fixed to one another by a bonding member such as a not-shown adhesive.

The input side connector 12, output side connector 14 and optical directional coupler 2 are aligned in their input/output ports, and connected optically and mechanically removably by a not-shown connection mechanism, or connected optically by using an adhesive or the like and fixed mechanically.

In the optical directional coupler 2 shown in FIG. 1, as explained before, the lid 10 is fixed to the constructed substrate 3 with the cores 6-1 and 6-2 buried in the clad layer 8 by heat pressing or heat fusing. If the materials of the clad layer 8 on the substrate 4 and lid 10 are the same, the boundary junction layer area becomes the material of the clad layer 8 and lid 10. If the materials are different, a boundary layer, or a mixed layer formed by fusing the composition of the materials of the clad layer 8 and lid 10, is formed.

Since the substrate 4 and lid 10 are combined by heat pressing or heat fusing without using an adhesive or the like, generation of internal stress is small in the junction layer. Therefore, generation of a polarization-dependent loss with respect to an optical beam can be suppressed. Particularly, if the materials or coefficients of thermal expansion of the clad layer 8 and lid 10 are substantially the same, and more preferably, if the materials or coefficients of thermal expansion of the substrate 4 and lid 10 are substantially the same, stress is rarely generated even if the atmospheric temperature of the optical directional coupler 2 is changed, and generation of a polarization-dependent loss is also suppressed. The substantially same coefficients of thermal expansion mentioned here mean that the ratio of the two is less than 6 times (the impurity content is about 10%), preferably less than 2 times (the same quality/same material).

The pressing means that the lid 10 is fixed to the constructed substrate 3 by pressing (press contacting) while heating. The fusing means that the lid 10 is fixed to the constructed substrate 3 by fusing a junction surface by heating a predetermined fusing portion over a fusing point. A fusing point has pressure-dependence, and if the atmospheric pressure for fusing is increased, or a high pressure is applied to the junction surface, the fusing point is of course lowered compared with that at normal temperature.

In the pressing, it is preferable to set a temperature higher than a distortion point to cause a viscous flow of glass. The pressure may be larger than the own weight of the lid 10, close to a value that the heated solid 10 is fixed to the constructed substrate 3.

For example, if the lid 10 and constructed substrate 3 are made of quartz or Vycor, the junction surface of the lid 10 and constructed substrate 3 are heated over 1000° C., preferably 1100–1200° C., and applied with a load, and held in the press-contacted state for a predetermined time, for example one hour or more, whereby they ate combined.

In the optical directional coupler 2 shown in FIG. 1, the structure with a pair of cores 6-1 and 6-2 provided on the substrate 4 as an optical waveguide circuit has been explained for the simplicity of description. It is permitted to provide one or more pairs of cores 6-1 and 6-2 on the substrate 4, as shown in the plane view of FIG. 2.

Next, an explanation will be given on a method of manufacturing the optical directional coupler 2 shown in FIG. 1.

Embodiment 1

Figure 3A:
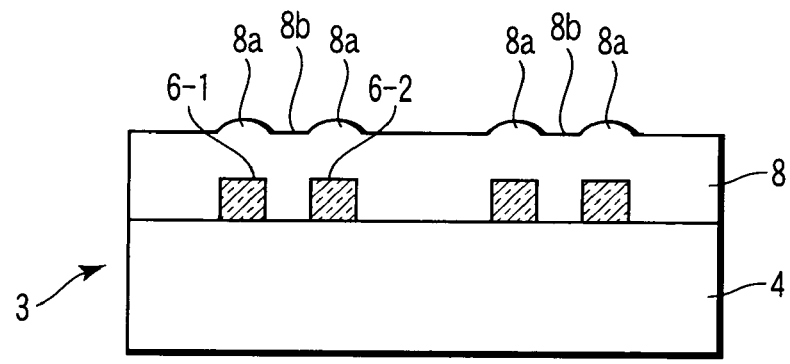
FIGS. 3A and 3B are schematic sectional views showing steps of manufacturing the optical directional coupler of FIG. 1.

A constructed substrate 3 is prepared as shown in FIG. 3A. A quartz glass flat plate composed mainly of silicon oxide is used as a substrate 4 of the constructed substrate 3. Two cores 6-1 and 6-2 with large refractive indexes compared with the substrate 4 are formed at predetermined positions on the substrate 4.

The cores 6-1 and 6-2 are formed by depositing silicon oxide ($SiO_2$) to a predetermined thickness by a chemical vapor deposition (CVD) method, and doped with phosphorous (P), titanium (Ti), germanium (Ge) or aluminum (Al) to increase the refractive index. The deposition layers, or the cores 6-1 and 6-2, are subjected to an etching process to eliminate unnecessary portions and to be shaped to suitable forms. The cores 6-1 and 6-2 are covered with a quartz-clad layer 8. The clad layer 8 is formed by depositing silicon oxide ($SiO_2$) to a predetermined thickness by the CVD method as in forming the cores 6-1 and 6-2. The clad layer 8 may be doped with boron (B) or fluorine (F) to decrease the refractivity.

The method of forming the clad layer 8 and cores 6-1/6-2 is not limited to the CVD method. They may be formed by a flame hydrolysis deposition (FHD) method, for example. The manufacturing method is not restricted to a specific method.

The substrate 4 is not limited to a quartz glass flat plate. Any materials may be used if the main component is silicon oxide ($SiO_2$) and the coefficient of thermal expansion is $1.0 \times 10^{-6}$ or less.

Figure 3B:
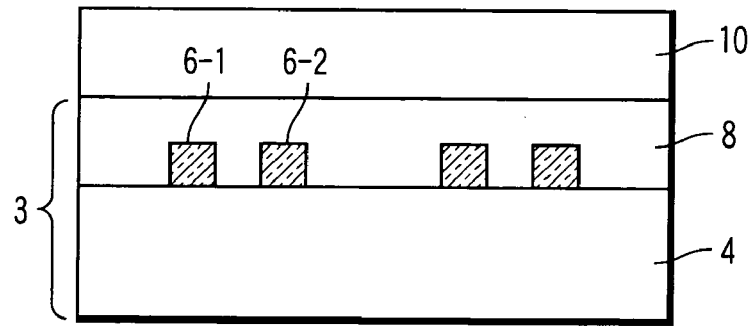

Next, as shown in FIG. 3B, a quartz glass flat plate composed mainly of silicon oxide ($SiO_2$) is prepared as a lid (cover member) 10. When the lid 10 and constructed substrate 3 are heated in an atmosphere giving an atmospheric pressure or isotropic pressure larger than atmospheric pressure, so that the junction surface of the lid 10 and clad layer 8 or the surface of constructed substrate 3 attains a predetermined temperature higher than the distortion point, for example 1175° C., a viscous flow is generated on the surface. The surface with the viscous flow is piled up, and pressure or a predetermined load, 163.3 g/cm² for example, is applied between the lid 10 and substrate 4.

The lid 10 and clad layer 8 are held pressurized for predetermined time, for example, 1 hour.

In the state that pressure is applied to the lid 10 and clad layer 8, silicon oxide that is the composition of the two components flows on the contacting surface, and as a result, the lid 10 is certainly fixed to the clad layer 8 through a junction layer, as shown in FIG. 3B.

If the lid 10 is quartz and the clad 8 is silicon oxide containing a doping agent, the junction layer becomes an area that the doping agent is diffused with the density lower than the clad layer 8. As the doped clad layer 8 has high fluidity, it broadens a contacting area and improves the adhesion to a junction surface when fixing the lid 10 to the surface of the clad layer 8. At the same time, the junction between the lid 10 and clad layer 8 is intensified, and the gap between the lid and clad layer is minimized.

The lid 10 may be made of materials other than a quartz glass flat plate. Any materials may be used if the main component is silicon oxide and the coefficient of thermal expansion is $3.5 \times 10^{-6}$ or less. For example, when quartz with a coefficient of thermal expansion of $0.58 \times 10^{-6}$ is used for the substrate 4, the lid 10 may be made of quartz with a coefficient of thermal expansion of $0.58 \times 10^{-6}$, Vycor glass with a coefficient of thermal expansion of $0.8 \times 10^{-6}$, boron silica glass with a coefficient of thermal expansion of $3.25 \times 10^{-6}$ (Pyrex glass), or the like. Multi-component glass with a coefficient of thermal expansion higher than $5 \times 10^{-6}$ breaks the lid 10 or substrate 4, and cannot be used.

In the optical directional coupler 2 of the embodiment 1, the materials of the substrate 4, clad layer 8 and lid 10 are substantially the same. Therefore, the coefficient of thermal expansion is the same, and even if the atmospheric temperature of the optical directional coupler 2 is changed, generation of internal stress is minimized, and a polarization-dependent loss can be suppressed.

In the constructed substrate 3 shown in FIG. 3A, gentle unevenness 8a and 8b may be generated on the surface of the clad layer 8 as a result of forming the cores 6-1 and 6-2. FIG. 3B shows the structure with the unevenness 8a and 8b eliminated by micro-polishing and the surface is flattened. However, as shown in FIG. 4, it is permitted to leave the concave 8b as a hollow space 8c.

Figure 4:
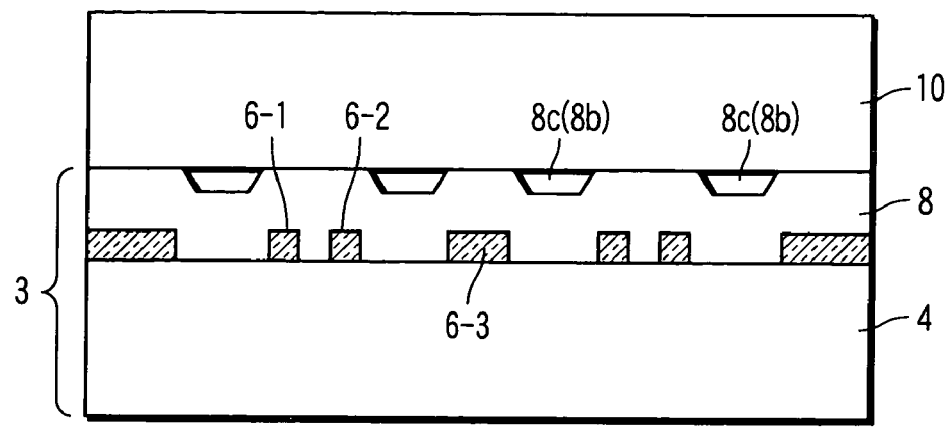
FIG. 4 is a schematic sectional view showing an optical directional coupler manufactured by a step different from the step shown in FIGS. 3A and 3B.

In the optical directional coupler 2 shown in FIG. 4, more than one pair of cores 6-1 and 6-2 is formed on the substrate 4, and a predetermined number of dummy cores 6-3 is arranged between the cores 6-1 and 6-2. Pairs of cores 6-1 and 6-2 are divided by the dummy core 6-3.

Figure 5:
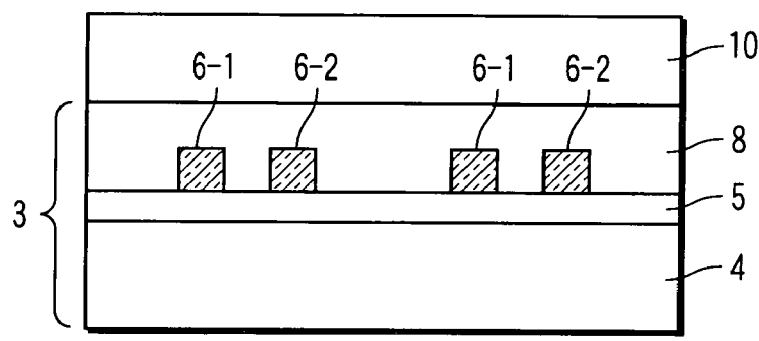
FIG. 5 is a schematic sectional view showing an optical directional coupler manufactured by a step different from the step shown in FIGS. 3A and 3B.

The constructed substrate 3 is not limited to the example shown in FIGS. 3A and 3B or FIG. 4. The constructed substrate 3 shown in FIG. 5 is also permitted. In the embodiment shown in FIGS. 3A and 3B and FIG. 4, a Si substrate with good workability can be used as a substrate 4, and it is easy to align with the other members by providing a V-shaped groove or the like (not shown) in the lower surface.

In the constructed substrate 3 shown in FIG. 5, the under-clad layer 5 as a first clad layer is formed over all areas on the substrate 4 by a CVD method or a flame hydrolysis deposition method. The cores 6-1 and 6-2 and clad layer 8 have been formed on the first clad layer 5, as explained above. Even in this constructed substrate 3, the lid 10 can be directly fixed on the constructed substrate by the above method as in the method shown in FIGS. 3A and 3B.

Even in this optical directional coupler 2, internal stress is small and a polarization-dependent loss can be suppressed even if the atmospheric temperature of the optical directional coupler 2 is changed.

Embodiment 2

Figure 6:
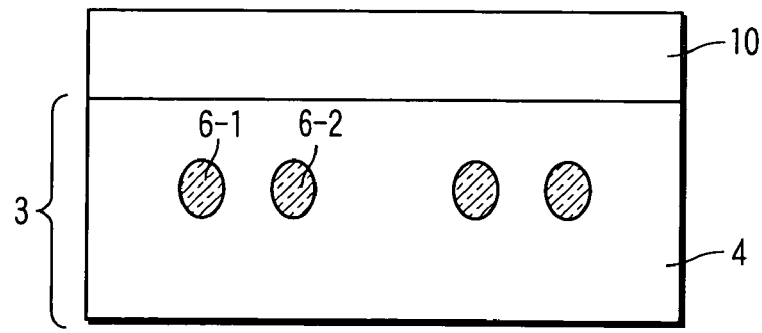
FIG. 6 is a schematic sectional view showing an optical directional coupler manufactured by a step different from the steps shown in FIGS. 3A and 3B.

The substrate 4 shown in FIG. 6 is a multi-component glass flat plate composed mainly of silicon oxide including sodium ions, for example, or a BK7 glass flat plate, for example. A predetermined area of the substrate 4 is masked and immersed in an ion-exchange solution, for example, a silver nitrate solution, to expose only the non-masked area to ion exchange, thereby forming the cores 6-1 and 6-2 in the predetermined area of the substrate 4. Namely, when a silver nitrate solution is used as an ion-exchange solution, sodium ions are replaced by Ag, and the cores 6-1 and 6-2 are formed with high refractivity. In this case, the cores are formed as a clad layer 8 over all areas of the substrate 4.

Next, When the multi-component glass lid 10 and constructed substrate 3 are placed in an atmosphere giving an atmospheric pressure or isotropic pressure larger than atmospheric pressure, and heated so that the junction surface of the lid 10 and the surface of clad layer 8 attains a predetermined temperature higher than the distortion point, for example 570° C. (the temperature higher than the fusing point under pressure), a viscous flow is generated on the surface. A viscous flow is generated on the stacked surface, and pressure or a predetermined load, 163.3 g/cm² for example, is applied between the lid 10 and substrate 4.

The lid 10 and constructed substrate 3 are held in the state that pressure is applied to the lid 10 and constructed substrate 3 for a predetermined time, for example, 1 hour. In the state that pressure is applied to the lid 10 and substrate 4, silicon oxide that is the composition of the two components flows on the contacting surface, and as a result, the lid 10 can be directly fixed to the substrate 4 as shown in FIG. 6.

A multi-component glass such as BK is available at a relatively low price, and the optical directional coupler 2 can be provided at a relatively low cost.

Figure 2:
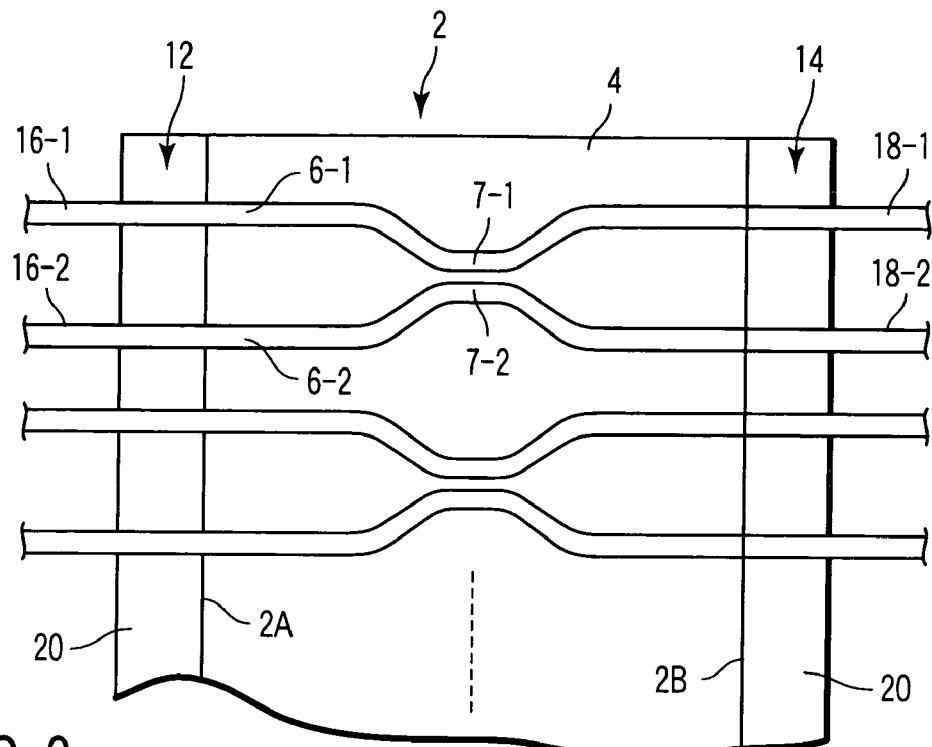
FIG. 2 is a schematic plane view showing the optical directional coupler shown in FIG. 1.
Figure 7A:
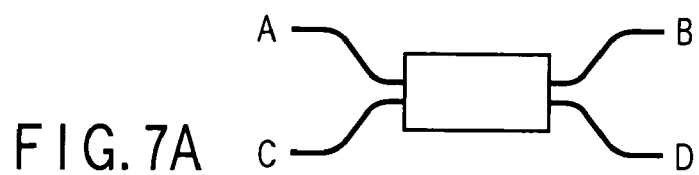
FIG. 7A is a schematic view explaining an example of combination of an optical directional coupler.
Figure 7B:
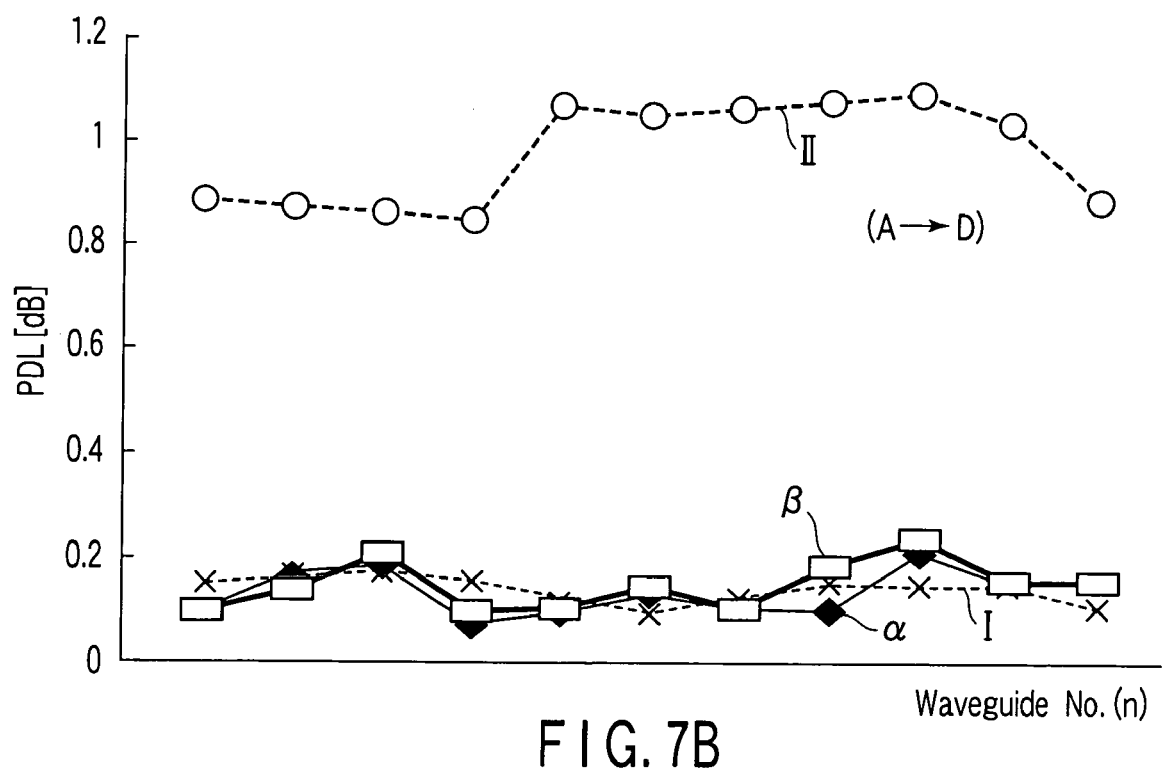
FIG. 7B is a graph showing the distribution characteristics of the optical directional coupler according to the invention, and a comparative optical directional coupler made by bonding a lid and clad layer with an organic adhesive, in the optical directional coupler in the combined state shown in FIG. 7A.

FIG. 7B shows polarization-dependent loss (PDL) [dB] when an optical signal input from one of input ports A and B (here, an input port A) is distributed internally and output from an output port D, in an optical waveguide circuit having more than one pair (11 pairs) of waveguides (optical directional coupler) as shown in FIG. 2, in which an optical signal input from one of two input ports A and B (input port A) is distributed internally and output from output ports B and D as shown in FIG. 7A.

FIG. 7B shows the PDL change curves α and β in the optical directional coupler 2 of this invention made by using quartz for the substrate 4, clad layer 8 and lid 10 and forming the clad layer 8 by heat pressing; and the PDL change curves I and II in the comparative optical directional coupler made by using the same material and bonding the lid 10 to the clad layer 8 with an organic adhesive.

In FIG. 7B, the dotted line curve I indicates the state before the lid is bonded (comparative example), the dotted line curve II indicates the state after the lid is bonded (comparative example), the solid line curve α indicates the state before the lid is heat pressed (this invention), and the solid line curve β indicates the state after the lid is heat pressed (this invention).

As can be seen from the curves α and I in FIG. 7B, when the lid 10 is not provided and when the constructed substrate (made by heat pressing) of this invention is used, the PDL [dB] of the output port D with respect to the input port A is within a range of 0.1–0.2 [dB]. However, as indicated by the curve II, when the lid is bonded to the constructed substrate 3 with an adhesive, the PDL [dB] is greatly increased to 0.9–1.1 [dB] and the characteristic is degraded. An explanation will be omitted for an optical signal input from the input port A and output from the output port B.

As is apparent from FIG. 7B, in the structure that the lid (cover member) 10 is fixed to the constructed substrate 3 by heat pressing, as in the present invention, the polarization-dependent loss (PDL) of an optical signal transmitted in an optical waveguide circuit is small.

The present invention is not limited to the embodiments described above and can be modified in various manners without departing from the spirit and scope of the invention. The embodiments may appropriately be combined as much as possible. In this case, an effect by the combination can be obtained.

In the present invention is to provide an optical waveguide circuit component with a suppressed polarization-dependent loss, and a method of manufacturing the same.

What is claimed is:

1. An optical waveguide circuit component comprising:
   a substrate;
   a clad layer mounted on the substrate to form a constructed substrate with the substrate;
   at least one core provided in the clad layer to form an optical waveguide circuit; and
   a lid fixed on the clad layer,
   wherein the clad layer and the lid are combined in a boundary area formed by a composition of the lid and a composition of the clad layer directly contacting the lid, and the lid has a refractivity which is higher than a refractivity of the clad layer.

2. The optical waveguide circuit component according to claim 1, wherein the substrate and the lid have substantially a same coefficient of thermal expansion.

3. The optical waveguide circuit component according to claim 1, wherein a composition of the substrate and the composition of the lid consist essentially of a same glass material.

4. The optical waveguide circuit component according to claim 1, wherein the clad layer comprises a first layer provided on the substrate and a second layer provided on the first layer; and
   wherein the at least one core is buried as the optical waveguide circuit in one of the first layer and the second layer.

5. The optical waveguide circuit component according to claim 1, wherein the lid does not contain boron.

6. A method of manufacturing an optical waveguide circuit component comprising:
   preparing a substrate and a lid;
   forming at least one core on the substrate;
   covering surfaces of the substrate and the at least one core with a clad layer to form a constructed substrate; and
   heat fusing or heat pressing the lid directly onto the clad layer,
   wherein the lid has a refractivity which is higher than a refractivity of the clad layer.

7. The method of manufacturing an optical waveguide circuit component according to claim 6, wherein the at least one core is formed by depositing core material, and the clad layer is formed on the surfaces of the substrate and the at least one core by depositing clad material.

8. The method of manufacturing an optical waveguide circuit component according to claim 6, wherein the at least one core is formed in a predetermined area of the substrate by ion exchange.

9. The method of manufacturing an optical waveguide circuit component according to claim 6, wherein the substrate is prepared by providing a clad material on the substrate.

10. The method of manufacturing an optical waveguide circuit component according to claim 6, wherein the substrate and the lid have substantially a same coefficient of thermal expansion.

11. The method of manufacturing an optical waveguide circuit component according to claim 6, wherein the substrate and the lid are made of substantially a same material.

12. The optical waveguide circuit component according to claim 6, wherein the lid does not contain boron.

13. An optical waveguide circuit component comprising:
   a substrate;
   a clad layer mounted on the substrate to form a constructed substrate with the substrate;
   at least one core provided in the clad layer to form an optical waveguide circuit; and
   a lid which is fixed on the clad layer and which is made of substantially a same material as the substrate, said lid having a refractivity which is higher than a refractivity of the clad layer,
   wherein the clad layer and the lid are combined by directly contacting each other.

14. The optical waveguide circuit component according to claim 13, wherein the substrate and the lid are made of substantially a same glass material.

15. The optical waveguide circuit component according to claim 13, wherein the lid does not contain boron.

* * * * *